United States Patent [19]

Staron et al.

[11] Patent Number: 5,363,094
[45] Date of Patent: Nov. 8, 1994

[54] STATIONARY SYSTEM FOR THE ACTIVE AND/OR PASSIVE MONITORING OF AN UNDERGROUND DEPOSIT

[75] Inventors: Philippe Staron, Mennecy; Jacques Cretin, Le Chesnay; Claude Beauducel, Henonville; Thierry Lepage, Noisy Le Roi, all of France

[73] Assignee: Institut Francais du Petrole, Rueil Malmaison, France

[21] Appl. No.: 991,594

[22] Filed: Dec. 16, 1992

[30] Foreign Application Priority Data

Dec. 16, 1991 [FR] France .................. 91 15691
Mar. 23, 1992 [FR] France .................. 92 03575

[51] Int. Cl.$^5$ .................................... G01V 1/40
[52] U.S. Cl. ........................... 340/854.6; 340/854.9; 340/855.8; 340/855.4; 340/855.5; 340/854.7; 166/250
[58] Field of Search ............ 340/854.7, 854.6, 854.9, 340/855.8, 855.4, 855.5; 166/250

[56] References Cited

U.S. PATENT DOCUMENTS

| | | | |
|---|---|---|---|
| 4,189,705 | 2/1980 | Pitts, Jr. ................ | 340/854.7 |
| 4,337,653 | 7/1982 | Chauffe ................. | 73/151 |
| 4,355,310 | 10/1982 | Belaigues et al. ........ | 340/861 |
| 4,408,307 | 10/1983 | Harris .................. | 367/79 |
| 4,794,534 | 12/1988 | Millheim ................ | 364/20 |

FOREIGN PATENT DOCUMENTS

| | | |
|---|---|---|
| 0228932 | 7/1987 | France . |
| 2613496 | 10/1988 | France . |
| 986128 | 3/1965 | United Kingdom . |
| 2067056 | 7/1981 | United Kingdom . |
| 2138249 | 10/1984 | United Kingdom . |

*Primary Examiner*—J. Woodrow Eldred
*Attorney, Agent, or Firm*—Antonelli, Terry, Stout & Kraus

[57] ABSTRACT

Monitoring of an underground effluent deposit (2) and the exploration thereof are performed by installing various devices or user modules : reception arrays (Ri, Rj, Rk) such as geophones or hydrophones, condition sensors (C1, C2), tools requiring electric power supply, etc, in various locations along one or several wells (1) drilled down into a formation, behind well casings or in the annular space between these casings and tubings, and by connecting these devices to a surface station (4), by means of a particularly simple and reliable multichannel transmission unit. The surface station adapts the commands thereof according to the device to be controlled in return, of receiving all the signals they transmit whether analog or digital and coded, and adapts to several modes of allocation of the transmission channels. With such a system, long-duration monitoring operations may be carried out on a large scale under satisfactory economic conditions.

34 Claims, 6 Drawing Sheets

FIG. 14

STATIONARY SYSTEM FOR THE ACTIVE AND/OR PASSIVE MONITORING OF AN UNDERGROUND DEPOSIT

FIELD OF THE INVENTION

The object of the invention is a system for the active or passive monitoring of an underground deposit penetrated by one or several wells by means of stationary receivers installed in the one or several wells penetrating this deposit.

The system in accordance with the invention is particularly suited to the active or passive monitoring of a reservoir zone containing petroleum effluents or of an underground gas reservoir.

Active or passive monitoring is any operation enabling specifying, through signal analysis by means of receivers the nature of the beds penetrated by the wells and/or the configuration thereof, the acoustic or seismic signals spontaneously emitted by a formation placed in production or the measurement in the wells of significant condition parameters, and centralization of the data gathered by the various receivers.

Data may be gathered by acoustic or seismic sensors such as geophones, or hydrophones within the scope of seismic prospecting operations in an oil deposit with a seismic source arranged at the surface or in another well or obtained by means of records of the acoustic signals produced by the deposit during the development thereof. The data to be transmitted to the surface may also be signals received by various sensors distributed along a well portion, these signals coming from formation discontinuities in response to the emission therein of acoustic or seismic waves. Monitoring of a formation may also be performed by transmitting to the surface various parameters measured in the well such as temperatures, pressures, flow rates, etc.

BACKGROUND OF THE INVENTION

There are well-known methods for studying or monitoring the evolution of an oil-bearing deposit for example, which comprise positioning of several sensors at determined intervals along the well or wellbore and the coupling thereof with the wall of the wellbore, triggering of a seismic source at the surface or in the same well as that in which the sensors are located or another one, and transmission to a central surface recording station of the signals picked up in response to the emitted waves, so as to locate by means of conventional processings the position of the underground reflectors. Significant results are obtained by carrying out spatial filtering of the picked up signals. Several sensors arranged in one or several sondes are displaced successively in a large number of different locations along the well and the recordings of the signals picked up are combined as is well-known by specialists.

Achieving such seismic operations generally requires that the well or wells containing the production equipments be temporarily shut down which is very disadvantageous and that the production equipments be removed to install the monitoring sondes and anchor them against the casings thereof.

U.S. Pat. Nos. 4,775,009 and 4,986,350 granted to the same applicant relate to a technique for avoiding unavailability of a well, which mainly consists of installing a large number of sensors outside casings for casing one or several wells and of connecting these sensors through transmission lines to a surface control and recording station. The casing being set, the sensors located in the annular space around it are coupled with the formations surrounding the well by the injected cement. The sensors are generally arranged in reception units fixed to the outside of the casing, fitted in housings placed on the outer wall of some of the sections thereof or arranged in intermediate connections specially provided. These reception units comprise housings for geophones and electronic modules allowing the signals received by the geophones to be adapted before being transmitted to a surface station by cables going up to the surface. This technique is suited when the number of reception units is limited because each one of them must be separately connected to a surface installation.

When a well is equipped for oil production, it is also well-known to place sensors in the annular space between the casing and the tubing, as described for example in patent FR-2,656,034 granted to the same applicant, and to press them against the casing so as to obtain proper acoustic coupling with the formations surrounding the well.

Patent application FR-91/15,483 filed by the same applicant describes a process for connecting together various reception units, notably seismic sondes, which mainly consists of arranging between them sealed hydraulic pipes resistant to the pressure prevailing in the well, so as to provide a common space isolated from the outside environment and to pass electrical conductors inside these pipes.

When one or several wells are to be equipped with sensors located behind a casing for example and intended to be definitively embedded in cement, sensors of very various types, likely to gather a large number of different types of data are to be set, so as to analyze and to follow better the evolution of the penetrated zone. As will be specified in the description hereafter, in connection with FIG. 1 notably, it is necessary for seismic applications with a seismic source located at the surface or in another well for example, to place sensors such as geophones, allowing seismic waves or the components thereof to be received along several axes, in a plurality of different depth levels, within a frequency range limited at most to 1000 or 1500 Hz. For applications relating to the passive monitoring of the evolution of a production zone, it is necessary to have several triaxial sensors placed in the well towards the top of the deposit or reservoir and capable of receiving signals within a frequency band that is wider than for the previous applications. One tries thus to pick up the seismic or acoustic activity that originates in the deposit during the bringing in thereof. The passband useful for this monitoring is generally wider than in the previous case. Other sensors may be placed in the well, in the part thereof penetrating the deposit to carry out tomography with a seismic source arranged in another well. It is also often useful to arrange in the well, at the level of the production zones, sensors which will be referred to hereafter as condition sensors, to measure various thermodynamic parameters: pressure, temperature, or parameters such as flow rates, measured by various instruments, etc.

The mode of transmission, to a surface installation, of the signals delivered by each of these types of sensors may be varied. For passive monitoring operations, the sensors must be connected permanently or almost permanently to the surface installation so that the significant signals picked up, which are often of random nature, may be transmitted at any time. Connection to the surface installation of the sensors used for achieving induced seismic recording cycles is only necessary during active seismic prospecting runs, and during time intervals of some seconds at each cycle generally, when permanent monitoring has to be stopped.

Connection of condition sensors located in the production zone to measure parameters such as temperatures or pressures may also be permanent or almost permanent. However, the inquiry frequency thereof may be much lower since the evolution of the parameters measured is generally slow.

The transmission system installed must put up with various data transfer modes. Transfer, to the surface installation, of the data obtained during active or passive seismic operations is generally achieved in a coded digitized form. In passive monitoring phases for example, the rate must be sufficient to transmit in real time the signals coming from several sensors arranged respectively at various depths, so as to appraise correctly the direction from which an acoustic shaking comes and the emission distance thereof. The rate necessary for the transmission thereof may reach in practice 1 Mbit/s. In induced seismic prospecting applications achieved with a large number of sensors, the necessary rate may greatly exceed this value. For other transmission modes, the required rate is definitely different.

Numerous condition sensors sense the parameters they measure in analog form such as a proportionate intensity current for example, and it is important that they may be transmitted to the surface.

The transmission system to be installed must thus be particularly flexible to process such various data transfers. Since it is stationary and may therefore often not be recoverable, and since it is often used for long-duration prospecting and monitoring operations, it has to be relatively simple, cheap and reliable. The lay-out thereof must also be designed so that a possible local failure does not challenge the reliability as a whole. Besides, especially when there is a large number of different types of devices distributed along the well, it is important that the permanent power consumption of each of them is moderate to remain within power limits that can be withstood by the transmission cables generally used in wells.

SUMMARY OF THE INVENTION

The object of the present invention is to provide a system for monitoring an underground deposit with the system solving the technical problem posed by large-scale exploration and monitoring operations in a subsoil zone, without making these wells unavailable and without requiring considerable modifications in the other equipments used at the same time in these wells.

The invention comprises in combination linking means including at least one linking cable, a surface station that may be connected to said at least one linking cable, at least one intervention assembly installed in a fixed position in a well and comprising an electronic monitoring module permanently connected to the linking means and being provided with means for decoding address signals, a user module and switching means controlled by the decoding means, to connect intermittently the user module to said linking means.

The linking means comprise for example at least one transmission line to transfer control signals to the monitoring module of each intervention assembly or for example at least one optical transfer channel to connect the user module of each intervention assembly to the surface station. This channel is associated with means for the bidirectional transmission and coupling of signals between each intervention assembly and said station.

According to one implementation, the invention comprises a surface station connected to the linking means and comprises at least power supply means for the monitoring module of each intervention assembly in the well and signal recording means.

This surface station comprises for example a control processor, means for applying electrical power to power supply conductors of the linking means and for applying address signals to activate a user module and allocate to it at least one signal transmission channel, and at least one specialized unit to communicate through these transmission channels with the activated user module.

The selective connections defined above make it possible to reduce the permanent monitoring electronic equipment and a larger number of intervention assemblies may therefore be supplied permanently by a single cable. Similarly, the switching means make it possible, for certain connection types, to maintain continuity of the power supply (electric conductors) and signal transmission lines over the overall length thereof as long as one of the user modules is not designated by selective addressing. The combination of means and the configuration thereof allows a simple, reliable and relatively cheap system to be obtained. By means of the specialized units of the surface station, the system in accordance with the invention may pilot several intervention devices of differing nature and allocate to them in a coordinated way the linking means for their exchanges with surface station.

It is also possible to install sizeable monitoring equipment in a well and even to equip several wells when justifiable by the size of a deposit.

According to one embodiment, the user module of at least one intervention assembly comprises for example reception means and a data adaptation and transmission unit, which comprises for example synchronization means to generate a local clock signal and to pilot a digitization of data produced by the associated reception means, as well as the transmission thereof, and the surface station comprises a specialized unit comprising automatic synchronization means to restore a clock signal whose phase is adapted to that of said local clock signal.

According to an embodiment, the reception means comprise several receivers and the adaptation and transmission unit comprises multiplexing means connected to said receivers.

These receivers are for example wave sensors and/or means for measuring condition parameters, connected to the multiplexing means.

According to an embodiment, the user module of at least one intervention assembly comprises at least one receiver to measure a condition parameter and delivering in response a proportionate current on at least one signal transmission channel via said switching means.

In case a user module comprises several of these proportionate-current receivers, the system in accordance with the invention includes selection means controlled by the associated electronic monitoring module to connect selectively one of these receivers via the connection means.

When the user module of at least one intervention assembly comprises at least one receiver to measure a condition parameter and delivering in response an electric signal, an adaptation and transmission unit comprising for example a voltage-controlled oscillator is used, whose output is connected selectively onto a transmission channel by means of said connection means.

The user modules may comprise mechanical means of any type connected in order to the linking means, such as various power supply transducer means (electromechanical, electromagnetic, piezoelectric seismic source, etc.), controlled valves or possibly motors, the surface specialized module comprising in this case a power supply pack suited to the application considered.

According to an embodiment, the system in accordance with the invention comprises at least one seismic so at least one array of receivers associated with an adaptation and transmission unit provided with a local clock, the specialized unit communicating with it being adapted to determine the frequency of the clock signal emitted by the local synchronization means, and the processor of the surface station comprises means for triggering this source and means for associating with the data received from the user module a signal indicative of the instants of triggering of said source.

According to another embodiment, the system in accordance with the invention comprises at least one array of receivers in boxes, associated each with electrical wires for the connection thereof to an electronic adaptation and transmission module, and sealed pipes of the hydraulic type arranged between these boxes and this module, allowing the electric conductors associated with the receivers of the array to pass through.

According to an implementation, the system in accordance with the invention may comprise at least one array of sensors arranged outside a casing of at least one well.

According to another implementation, the system comprises at least one array of sensors arranged outside an effluent tubing set in at least one well.

These sensors may be for example single-axis or three-axis geophones, hydrophones and notably continuous hydrophones whose length is sufficient to perform spatial filtering of the waves received.

The system in accordance with the invention may combine for example at least one first array of acoustic or seismic receivers associated with an adaptation and transmission unit and at least one second array of condition sensors associated with a second adaptation and transmission unit, the surface station comprising at least two different specialized units for communicating respectively with said adaptation and transmission units, these specialized units being connected to the processor by means of interface circuits.

The invention further relates to a method for the active and/or passive monitoring of a subsoil zone penetrated through by at least one wellbore, comprising:

installation, in a fixed position, of the system described above;

allocation, by the surface station, of signal transmission conductors to an intervention assembly by applying control signals addressed to the associated electronic monitoring module on conductors for transmitting cable signals, and the decoding thereof by the decoding means in said monitoring module;

control, by this monitoring module, of the switching means enabling connection of the user module, and transfer of the signals received by the intervention assembly under control of the user module and according to determined modes of transfer towards a specialized unit of the surface station, adapted for receiving these signals and for conforming to all the modes characterizing the transfer.

BRIEF DESCRIPTION OF THE DRAWINGS

Other features and advantages of the system and of the method in accordance with the invention will be clear from reading the description hereafter of embodiments given by way of non limitative example, with reference to the accompanying drawings in which.

DESCRIPTION OF THE PREFERRED EMBODIMENTS

Figure 1:
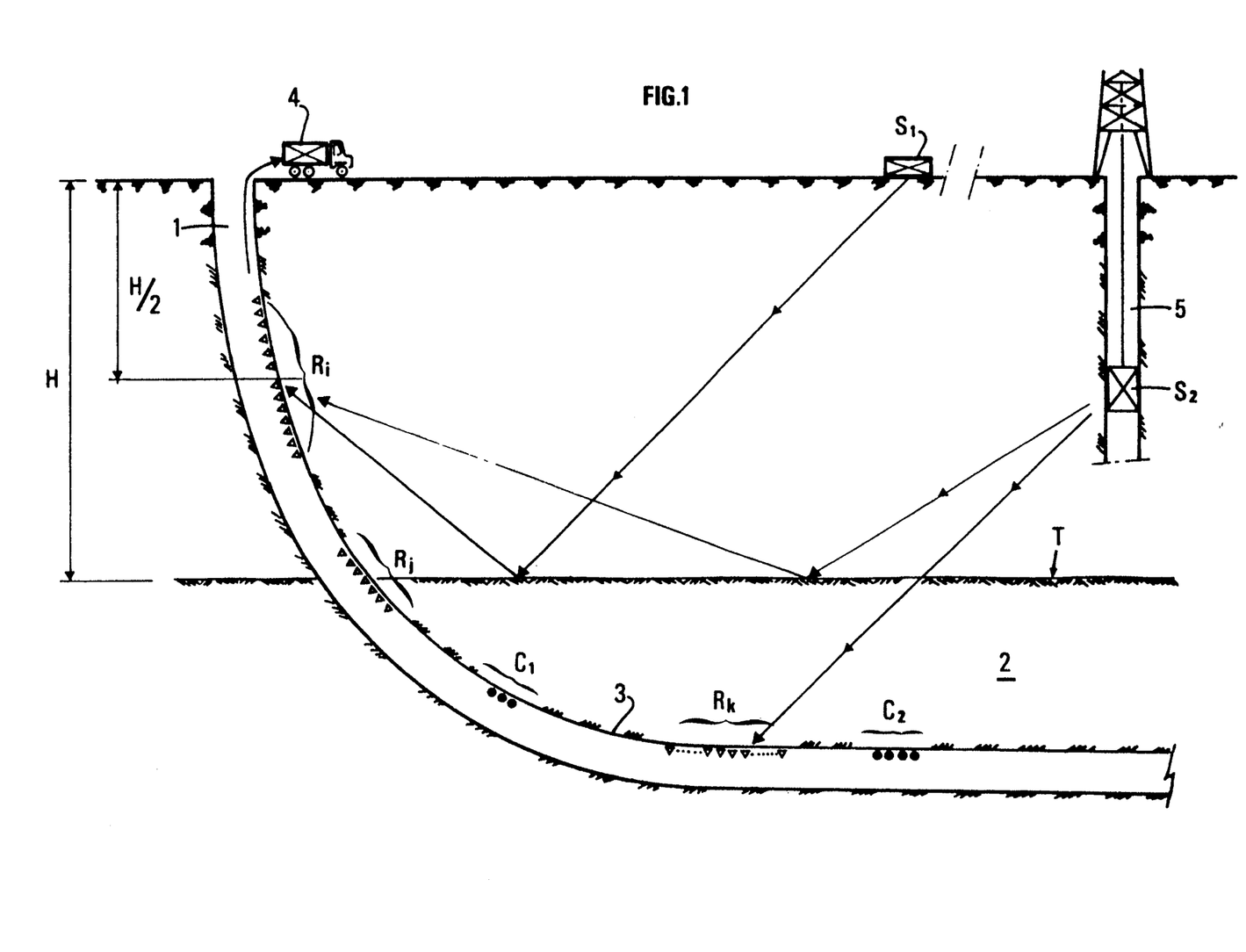
FIG. 1 shows a lay-out of various devices or receivers (intervention assemblies) which may be arranged in a well for the active or passive monitoring of a deposit for example.

FIG. 1 diagrammatically shows a well 1 drilled through an underground deposit 2 containing for example petroleum effluents. The well must be provided with a casing 3 down to a certain depth, this casing being linked to the surrounding formations by injecting cement into the annular space between the casing and the well, as described in patents FR-2,593,292 and 2,642,849 cited above.

In order to monitor the deposit penetrated by such wells, it is advisable, as mentioned previously, to arrange receivers capable of measuring or detecting signals of differing types. The top T of the reservoir being at a depth H, an array Ri of geophones, preferably triaxial, is set halfway down at a depth H/2 for example, so as to be able to carry out a seismic type exploration. A source S1 arranged at the surface or a source S2 arranged in another well emits waves which, after reflection on the subsoil discontinuities, are picked up by the geophones of array Ri, transmitted to a surface station 4 which records them and they are then processed in order to obtain representative seismic profiles. For this type of exploration, the passband of the signals received is generally limited to 1000 or 1500 Hz. The transmission duration of the seismic signals picked up after a formation exploration is relatively short, in the region of ten seconds at most.

An array of sensors Rj is for example set towards the top of the reservoir to carry out passive monitoring. One or several other reception arrays Rk are arranged deeper in the part of the well penetrating the reservoir to pick up seismic waves emitted by a seismic source S2 located in another well 5. This array may comprise for example a double digit number or even several hundred single-axis geophones or hydrophones distributed a great length of the well. Since the seismic emissions induced by the production activity appear randomly, it is important that the specialized sensors of array Rj be permanently connected to surface station 4, except, possibly, during very limited time intervals when the seismic receivers of arrays Ri and Rk must be connected.

FIG. 1 also shows two arrays of condition sensors C1, C2 enabling reading of the temperature, pressure, etc. They may be, for example, sensors of a well-known type referred to as proportionate-current sensors. When a determined supply voltage is applied to sensors of this type, they absorb currents proportionate to the parameters measured, which are to be transmitted to surface station 4.

The transmission unit which will be described hereafter may adapt to each of the receivers mentioned above, with their own connection specifications, transmission modes, coding frequencies and data transfer rates.

Figure 2:
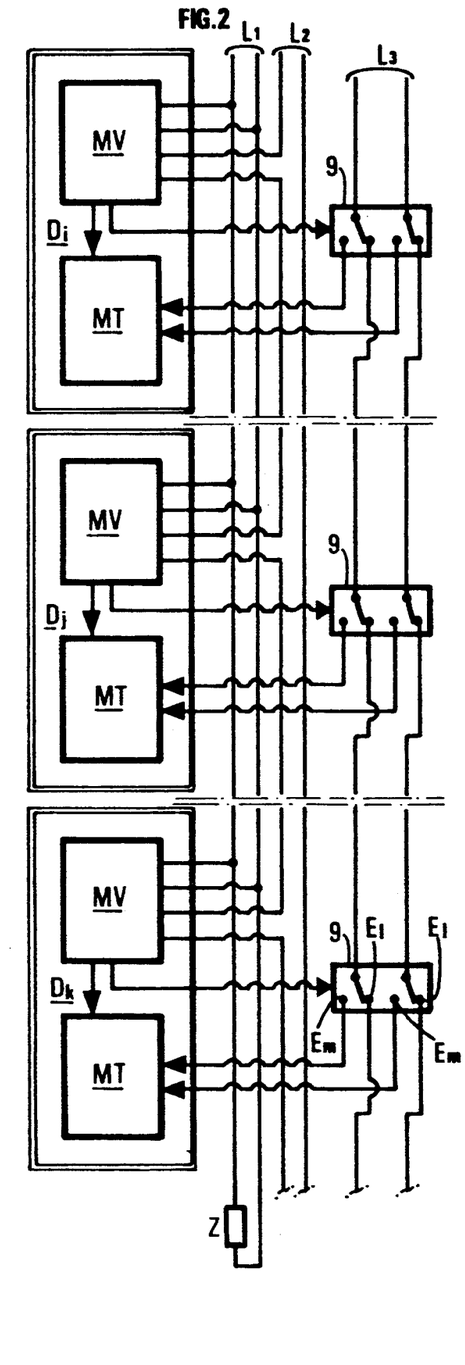
FIG. 2 diagrammatically shows electric conductor lines providing the necessary links between intervention assemblies and the surface station.

The diagram of FIG. 2 shows three well devices Di, Dj, Dk (such as the receiver arrays Ei, Ej, Ek in FIG. 1) installed in a fixed position in a well, behind a casing or in the annular space between a casing and a tubing, and at various depths.

Figure 3:
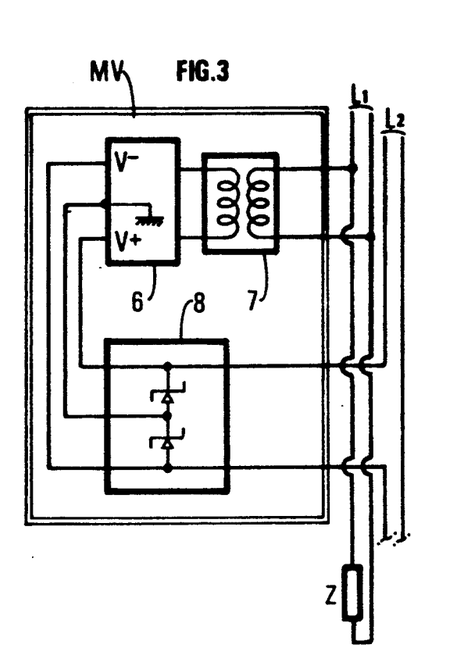
FIG. 3 shows a first mode of connection of an electronic monitoring module to power supply lines.

Each of these devices comprises two modules. A first module MV is used to perform permanent monitoring while waiting for orders likely to be transmitted to them by the surface station at any time. A second module or user module MT is set in order to emit signals to the surface station or to receive signals. According to the connection mode of FIG.2, the modules MV of the various devices are permanently connected to an order transmission line L1 linked to the surface station. Through this line, they receive coded orders associated with an address designating specifically one of them. With reference to FIG. 3 each of the monitoring modules MV comprises an address and orders decoder 6 connected to line L1 by means of an insulating transformer 7 and an electric control assembly 8 to produce one or several voltages of controlled amplitude V+, V− (5 V or 15 V for example) necessary for the running of address and orders decoder 6.

According to the embodiment of FIGS.2, 3, the control pack 8 of each of the monitoring modules MV is connected to a specific power supply line L2 connected in the surface station to electrical current generator. It generates, in Zener diodes of assembly 8, a voltage sufficient to supply module MV.

Figure 4:
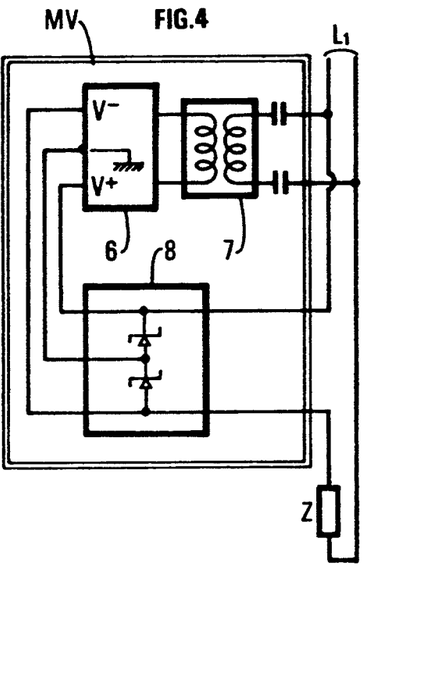
FIG. 4 shows a second mode of connection of a monitoring module to power supply lines.

According to the embodiment of FIG. 4, line L1 is a mixed-use line. It is used both to convey current for powering each pack 8 and to transmit orders. In this case, uncoupling means in the form of transformer 7 are of course interposed between mixed-use line L1 and address decoder 6. A third line L3 in FIG. 2 is connected to the surface station. A switch 9 (FIG.2) controlled by the address decoder 6 of the associated monitoring module MV is connected on this line L3 at the level of each user module MT. When switch 9 is not activated, it provides electrical continuity of line L3 through the switch. In an activated position, each switch 9 provides connection of line L3 to module MT. For some applications, as will be described in connection with FIG. 10, line L3 may be electrically supplied by the surface station. In this case, activation of switch 9 has the effect of switching on a user module MT.

Figure 5:
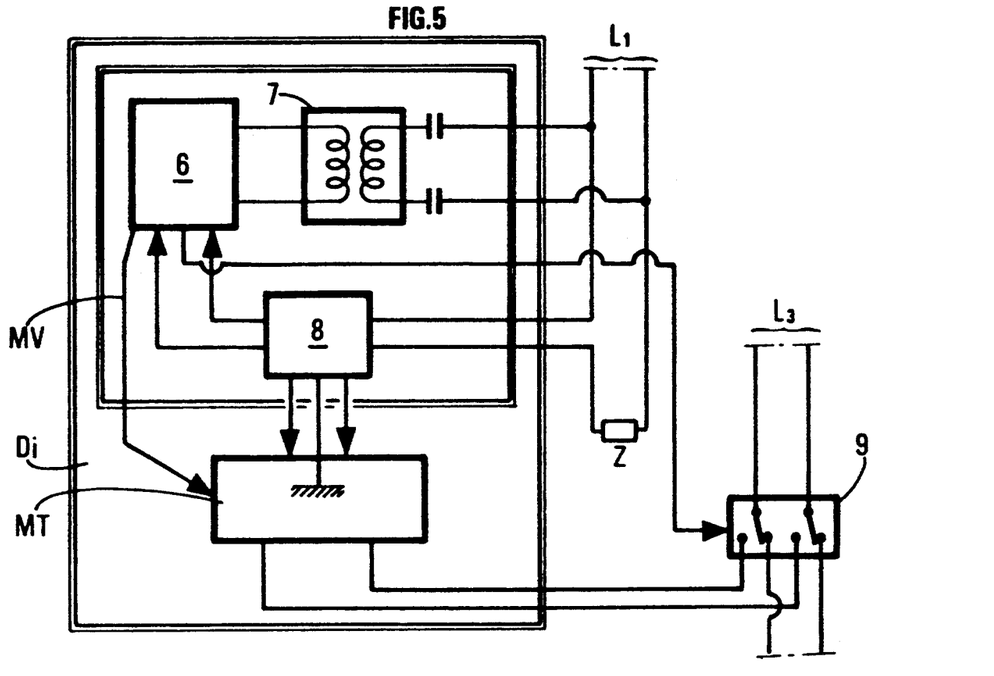
FIG. 5 shows a mode of power supply of a user module.

According to the embodiment of FIG. 5, when the controlled voltages produced by a power assembly 8 are suited for the running of the user module, a direct electrical connection controlled by the address decoder of module MV may be established between them.

Power supply of the monitoring modules MV and possibly of the user modules is achieved by means of the current generator 8, as shown in the embodiments of FIGS. 3, 4. Power supplies may however be achieved by voltage generators, the monitoring modules MV being connected in parallel on lines L1 or L2 according to the circumstances and comprising for example a switching power assembly to produce the voltages necessary for these modules.

Figure 6:
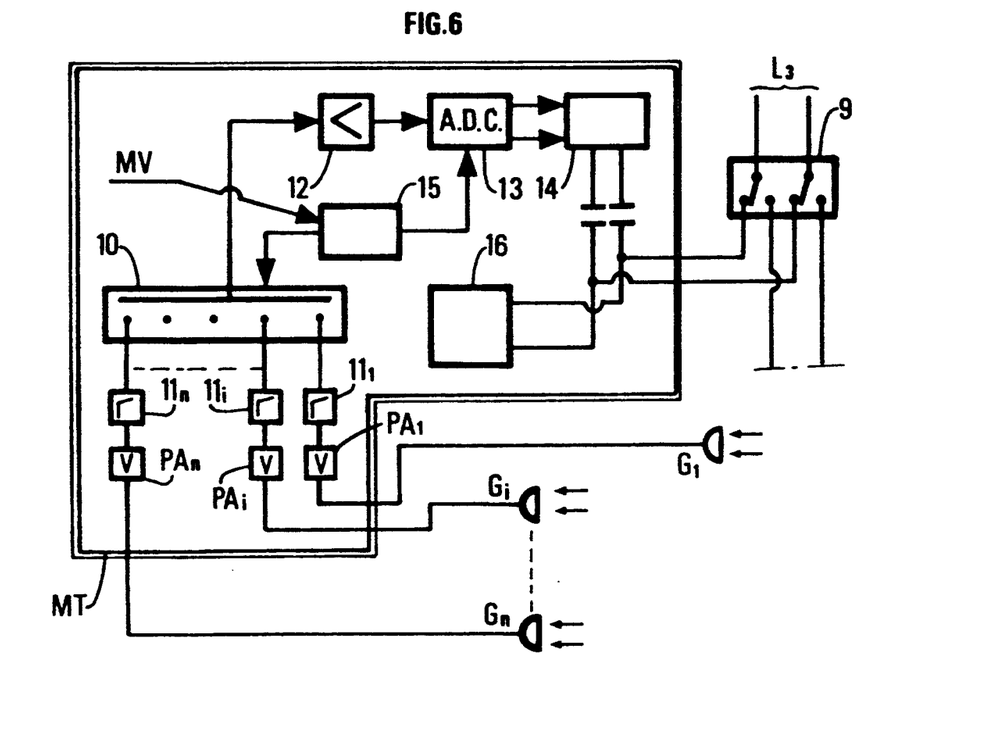
FIG. 6 diagrammatically shows a signal acquisition module with the powerpack thereof in a user module comprising arrays of receivers.
Figure 7:
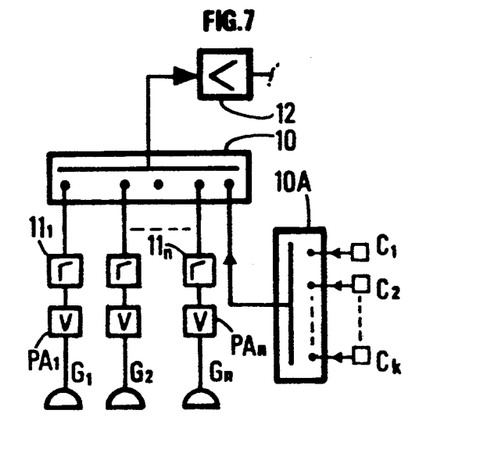
FIG. 7 diagrammatically shows an alternative embodiment of the signal acquisition module of FIG. 6.

According to the embodiments of FIGS. 6, 7, the user module is a digitized and coded signal emitter. It comprises for example a certain number n of receivers G1, G2 ... Gn that may belong to one of the arrays Ri, Rj or Rk (see FIG. 1). The signals picked up by receivers G1 to Gn are applied respectively to fixed-gain or variable-gain preamplifiers PA1, PAn followed by limiting filters 111; to 11n. The amplified and filtered signals are applied to inputs of a multiplexer 10. The output of the latter is connected to the input of an acquisition circuit comprising for example an automatic switchable gain amplifier 12, an analog-to-digital converter 13, a coding element 14 to include the numeric words from the converter 13 in an emission pattern and a synchronization element 15 comprising a local clock which is connected to the order decoder in the monitoring module MV. Such circuits are for example described in U.S. Pat. Nos. 4,862,425, and 4,901,289 and 2,616,230 of the same applicant. The user module further comprises a voltage regulator 16 generating stabilized voltages for the running of the user module. In an application of this type, line L3 is switched on and regulator 16 is connected thereto by means of switch 9. The output of coding element 14 is also connected to line L3 via switch 9 and uncoupling means.

If a high-dynamic analog-to-digital converter (ADC) is available, the switchable gain amplifier 12 may possibly be removed, which is more economic and more reliable.

According to the alternative embodiment of FIG. 7, a secondary multiplexer 10A may also be connected to one of the input channels of multiplexer 10. Several condition sensors C1, C2 . . . Ck translating a measured signal into a voltage are connected to the inputs of this submultiplexer 10A. At regular intervals set by synchronization element 15, the voltage delivered by each of these condition sensors may be sampled and transmitted to the surface station via line L3.

Each one of the user modules installed in a well for signal acquisition may have its own clock frequency, adapted to the number of associated receivers and/or to the Dassband of the signals picked up. Each one of them may also have its own coding mode.

The gain of each preamplifier 11I to 11n may be fixed and preset before setting the device in the well. However, in some cases for which the level of the signals to be amplified depends on specified application, a preamplifier 11I to 11n, whose gain may be switched on reception of a specific order addressed from the surface station to the decoder 6 of the associated monitoring module MV, and decoded by the latter, is preferably used.

Figure 8:
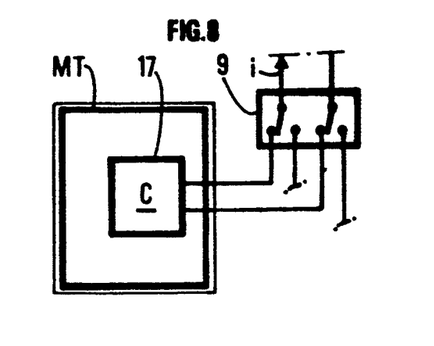
FIG. 8 diagrammatically shows a proportionate-current condition sensor in a user module.

According to the embodiment of FIG. 8, the user module may also be a proportionate-current sensor 17 of a wellknown type. When this type of sensor 17 receives, from line L3 via the associated switch 9, a determined voltage, it allows a current proportionate to the parameter value it is measuring, between 4 mA and 20 mA for example, to pass through.

Figure 9:
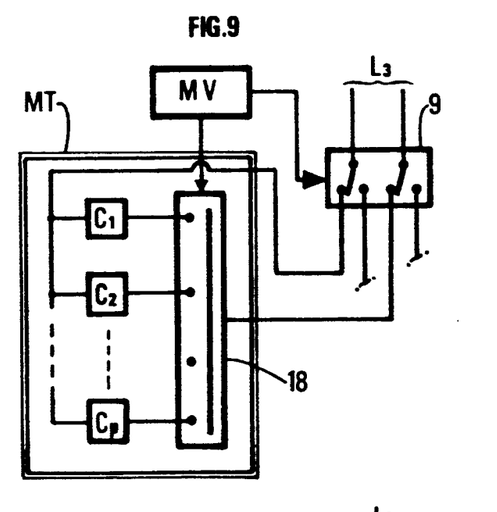
FIG. 9 diagrammatically shows a mode of connection of several proportionate-current condition sensors in a single user module.

According to the variant of FIG. 9, several condition sensors C1, C2 . . . Cp of the same proportionate current type ]0 may be connected to switch 9 by means of an intermediate switch 18. In this case, the surface station transmits to the address decoder 6 (FIG. 3, 4) of the associated monitoring module MV, an addressed order designating the user module concerned by the order, as well as the number of the condition sensor C1 to Cp whose measurement is desired. Decoding of this number allows intermediate switch 18 to be activated.

Figure 10:
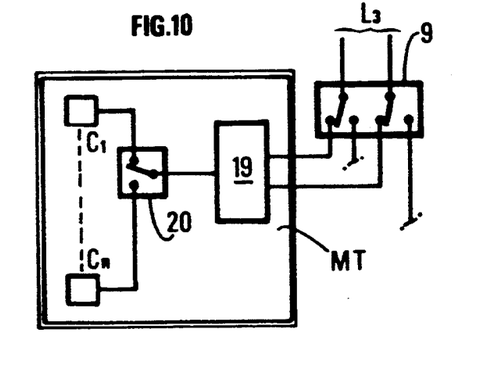
FIG. 10 diagrammatically shows a module for transmitting to the surface station slowly varying measurements provided by condition sensors.

The module illustrated in FIG. 10 is suited to transmit slow varying voltages delivered by condition sensors C1 . . . Cm such as temperature or pressure sensors for example, or flowmeters. It comprises an oscillator 19 whose frequency varies linearly as a function of a control voltage (VCO), in this case that is delivered by one of these condition sensors C1 to Cm with this oscillator delivering a signal which is applied to line L3 via switch 9. When several condition sensors can control a single oscillator (VCO) 19, they are connected thereto by means of an intermediate switch 20 such as switch 18 mentioned above.

Line L3 may also be used to supply power to user modules comprising electromagnetic means such as motors, solenoid valves, etc, installed in a fixed position in the annular space between a casing and a tubing for example, or possibly any means located outside a casing. These modules are also associated each with a monitoring module MV and supplied by means of a switch 9 on line L3.

The surface station (FIG. 11) is adapted for performing a large number of applications such as those defined above. The signals received from the user modules being highly varied, the working principle consists of leaving to that which is concerned by an order free disposal of line L3 and control of the transmission, and of adapting the surface station to the transmission mode of the activated module.

Figure 11:
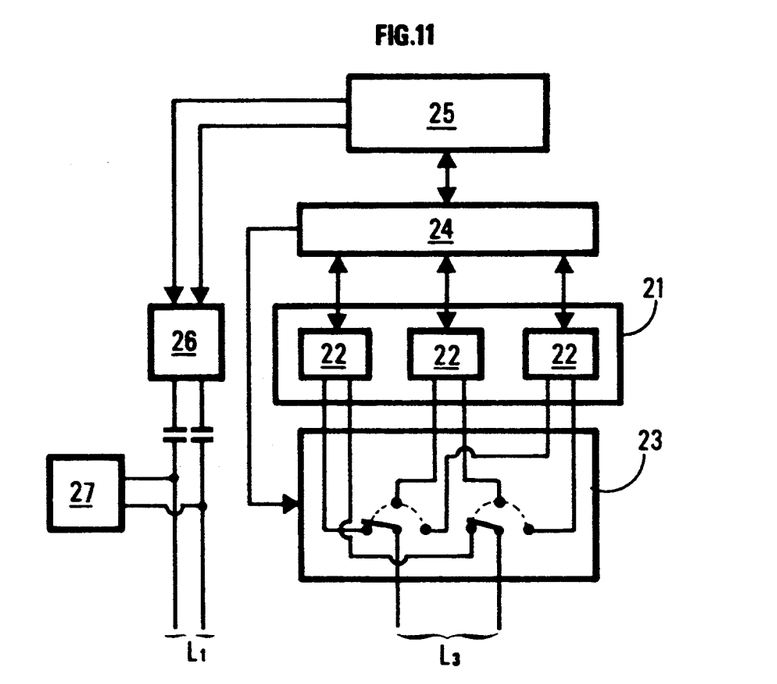
FIG. 11 diagrammatically shows the surface station controlling exchanges with the intervention assemblies.

The surface station comprises an array 21 of several specialized units 22 and a selector 23 to connect line L3 to one of them. By means of an electronic interface card 24, array 21 is linked to a processor 25 such as a programmed microcomputer. The station further comprises an address coder 26 connected to line L1 and a power generator 27. According to the connection mode shown in FIG. 4, generator 27 is also connected to line L1. Processor 25, when controlled by an operator or in accordance with a pre-established program, transmits connection orders to a specific monitoring module MV through line L1, by means of address coder 26. At the same time, it controls the switching of selector 23 so that line L3 is connected to the specialized unit 22 and that it may communicate with the user module set in the well at the address stated.

Units 22 adapted to the reception of measurements taken by proportionate-current sensors 17 (FIGS. 8, 9) comprise each, for example, an element for converting the current flowing on line L3 into a signal indicative of the parameter measured in the well by the designated condition sensor, this element transmitting the signal measured to processor 25.

User modules such as those in FIGS. 6 and 7 perform acquisition of signals and the transmission thereof under the control of a local clock susceptible to frequency or phase derivation for various reasons. Consequently, units 22 suited to restore a clock signal in phase with that marking the transmission are used for the reception of coded digitized signals coming from the acquisition modules. Such a unit is for example described in patent application FR-91/132770 filed by the applicant. These specialized units comprise in this case a power supply means which is also connected to line L3, so as to supply the voltage regulator 16 (FIG. 6) included in the signal acquisition module.

When the activated user module comprises an array of seismic sensors and the associated acquisition module thereof, which is used within the scope of seismic prospecting operations with activation of a seismic source, the processor triggers the associated acquisition module MT before triggering the source. When the processor receives the signal indicative of the triggering of the source, it applies a marker onto the digitized seismic signals received on line L3 and associates thereto the value of the clock frequency measured by the unit 22 managing the exchange. Thus, if seismic traces obtained by distinct arrays, in a single well or possibly in other wells, are to be combined together, the timing thereof may be easily achieved previously.

A specialized module for supplying power via conductors L3 to user modules comprises in this case a current or voltage generator.

Figure 12:
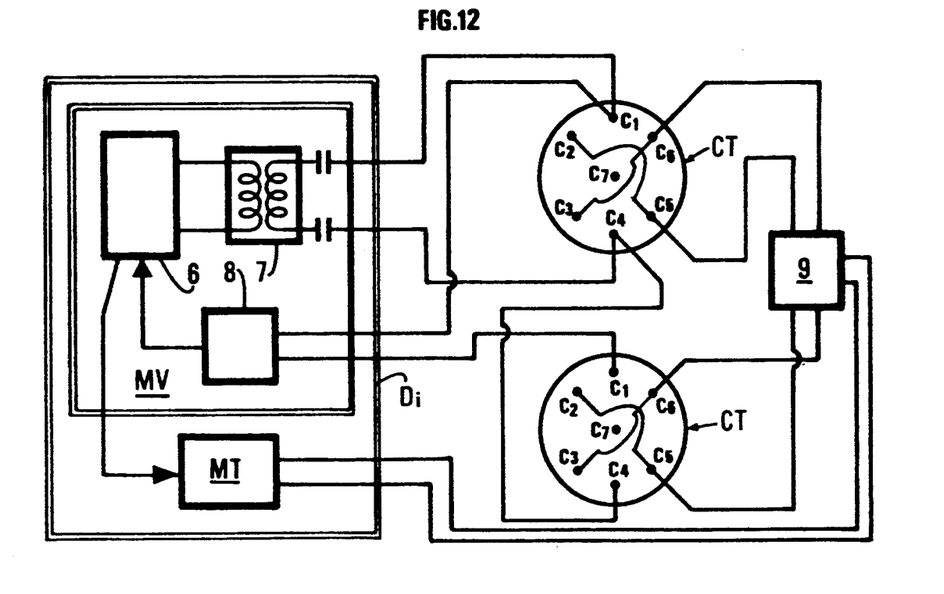
FIG. 12 shows an embodiment where for example a multi-conductor cable is used to connect signal reception arrays.

According to the embodiment of FIG. 12, the cable used may be of the seven conducted type with six conductors C1 to C6 distributed around a central conductor C7 and a peripheral braid CT. In this case, the connection mode shown in FIG. 12 may be adopted for each well device. The primary winding of transformer 7, in modules MV, is connected to conductors C1 and C4, the secondary winding thereof being connected to address and orders signal detector 6. The regulated power pack 8 is connected in series to conductor C4 for example. User module MT is connected between the junction of conductors C2 and C5 on the one hand and of conductors C3 and C6 on the other hand.

Figure 13:
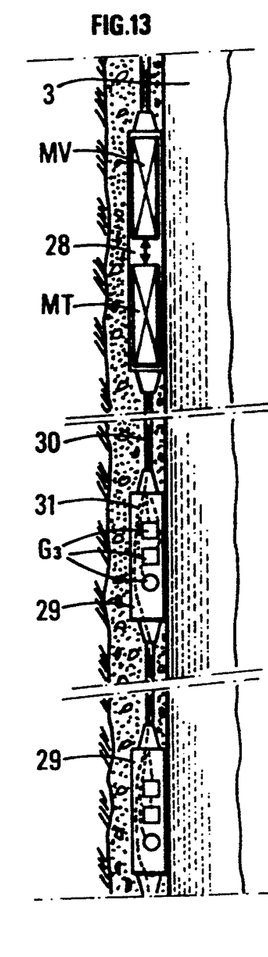
FIG. 13 shows a lay-out of several boxes of receivers located outside a casing with hydraulic pipes through which electric links pass between the boxes and an associated electronic module.

An electronic signal acquisition module such as that of FIGS. 6, 7 for example can process signals of an array of receivers located in the vicinity thereof. It may however be used to group together signals coming from receiver arrays distributed over a relatively great well length. To that effect, the box 28 containing the module is linked, as shown in FIG. 13, to one or several boxes 29 containing receivers such as triaxial geophones, by means of sealed hydraulic cables 30. The electric conductors 31 of the geophones pass along this sealed circuit up to the electronic housing MT. Such a lay-out is described in patent application FR-91/15,483 cited above and filed by the applicant.

According to another embodiment, communication means may comprise one or several cables with a single line fulfilling the functions of lines L1, L2 and L3 cited above, this line consisting for example of the core of the cable and of the sheath or outer conducting braid thereof.

Separation of the functions may be done by using different frequencies. The electric current is direct current. The binary order or control signals are rendered through signals modulated from two particular frequencies $f_0$ and $f_1$, and the responses of the user modules are rendered through signals modulated from two other particular frequencies $f_2$ and $f_3$.

Separation of the various functions may also be achieved according to a mixed mode combining frequency and time. The electric currents are direct currents. The order or control signals are transmitted during a sufficient time interval. On reception of the orders, the user modules then have a determined time interval for transmitting transmit response signals.

Using a single-line cable allows the problem of the passage of links through subsea well heads for example to be solved more easily.

The total communications between the surface station and the intervention assemblies along wells may also be achieved by means of one or several mixed cables each comprising conducting lines to transfer electrical power and to transmit orders addressed to the monitoring modules, and also at least one optical fiber to transfer responses towards the surface station, or else distinct cables, some comprising electrical conducting lines, others including optical fibers. Using optical fibers makes it possible to considerably increase the rate of data likely to be transferred towards a surface station.

Figure 14:
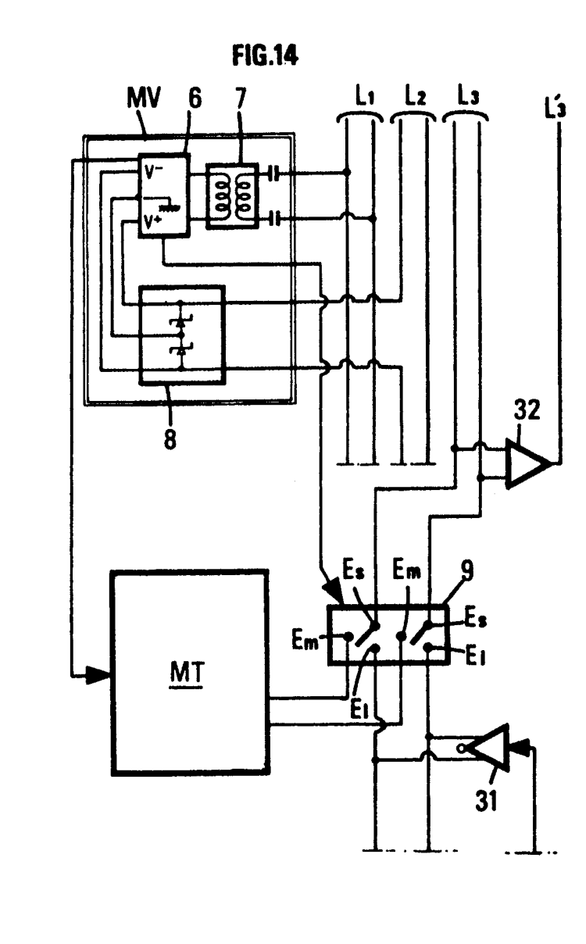
FIG. 14 shows another embodiment comprising optical type transmission means for the transfer of data from user modules up to the surface station.

According to the embodiment of FIG. 14, the line L3 of the embodiments of FIG. 2 is accompanied with an optical fiber L'3 provided with optical coupling means at the level of each user module. These coupling means comprise for example an optical coupler 31 translating the light signals on fiber L'3 into electric signals which are applied to switch 9 on the inputs EL thereof. A coupler 32 inverse to the latter coupler 31 is connected on the output channels ES of this switch 9. This coupler translates into light signals the electric signals coming from switch 9 and applies them onto fiber L'3. The monitoring module is connected to the surface by two conducting lines L1, L2 (FIG. 2, 3) or by a single mixed-use line (FIG. 4). This mixed embodiment is suitable in the general case where the intervention device installed in the well comprises user modules MT which become active providing that they are supplied with power from the surface through an electrical conducting line, and which cannot be directly supplied by the power pack such as pack 8 (FIGS. 2-4 for example), notably because of the electric consumption thereof (electric motors, acoustic or seismic sources, etc). In this case, line L3 may be used notably to transfer electrical power to the user modules and line L'3 may be used to transfer signals picked up or measured in the well to the surface station.

Figure 15:
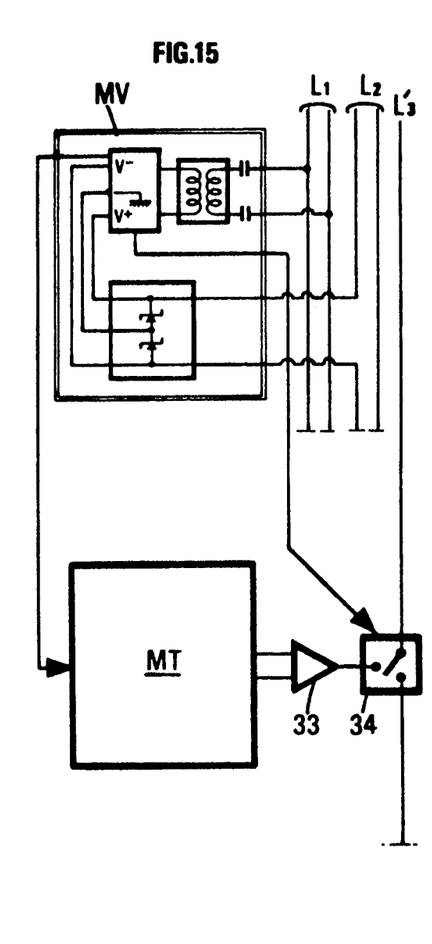
FIG. 15 shows another embodiment where transmission of the responses from the user modules is totally provided via one or several optical transmission channels.

According to the embodiment of FIG. 15, all the communications between the user modules and the surface station are entirely conveyed optically by means of at least one optical fiber L'3. In this case, the user module MT is connected, by means of an optical coupler 33, to an input of an optical switch 34 interposed on the optical fiber. The monitoring module is, in this case, connected to the surface through two lines L1, L2 as described above. This embodiment is suited to applications where the user modules are sensors or measuring devices having to transmit only data towards the surface station.

Figure 16:
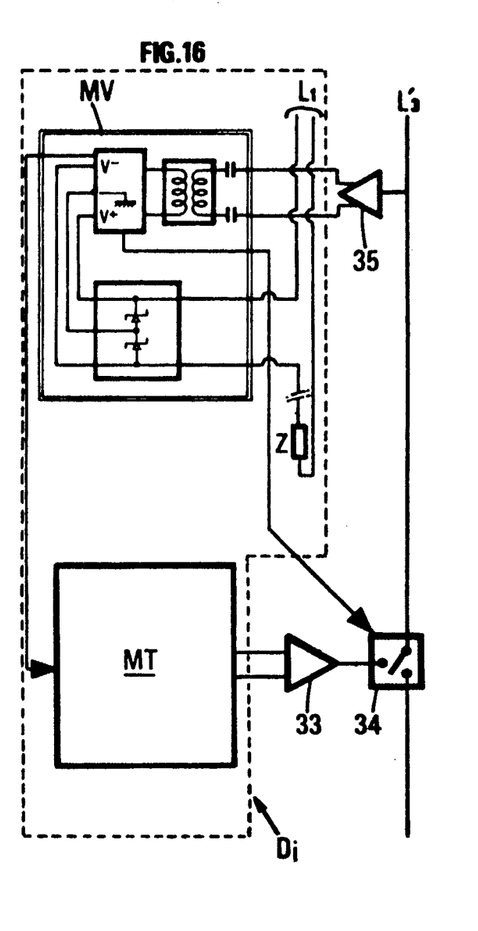
FIG. 16 shows a modification of the previous embodiment with bidirectional optical transmission means for the transfer of orders and data.

According to the embodiment of FIG. 16, each monitoring module MV is connected on a permanent power supply line L1 and all the signal communications between the surface station and intervention assemblies Di are conveyed in both directions with different transmission modes via one or several optical fibers L'3. In this case, the address decoder of each monitoring module MV is connected to line L'3 by means of separator 35 adapted to isolate the signals transmitted from the surface station by a generator such as the generator 27 of FIG. 11 and translated into optical signals by an optical coupler (not shown).

With the appropriate separators and/or optical couplers, the previous optical transmission channels may replace lines L1 and/or L3 in all the embodiments and utilizations of the system described previously in reference to FIGS. 1–13. The specialized units 22 (FIG. 11) are then connected to the optical channel by appropriate coupling means.

Generally speaking, linking means comprising in all cases at least one electrical conducting line to transfer power from the surface station, in the form of current and/or signals and at least one optical transmission channel for the single- or bi-directional transfer of signals between this station and the intervention assemblies Di in the well may be used.

Without departing from the scope of the invention, the line or optical fiber portions between the successive intervention devices may be doubled in order to overcome possible failures in case of localized leaks or inrushes. Before implementing the system, complete links between the surface station and all the intervention assemblies may be achieved as shown for example in U.S. Pat. No. 4,398,271, by interconnecting in series portions of lines or optical fibers and, at each new interconnected portion, by testing the transmission performance on the channels lengthened thereby.

The monitoring system in accordance with the invention may be installed in a fixed position behind a casing and sealed by cementing. The geometry of such a system is of course immutable. If measurements or records are to be achieved during the period of monitoring of the deposit which may sometimes last for years, at intermediate depths where no appropriate receiver is installed, one or several receiver arrays may be used and secured to a tubing taken down to the intervention depth required, outside the tubing. A lay-out such as that described in patent FR-2,656,034 of the applicant, which allows uncoupling of the reception array in relation to the tubing, is preferably used. A transmission unit provided with several lines, such as that described above, is used in this case to connect it to the surface station.

The examples of receivers mentioned are of course not limitative. Continuous stationary sensors of great length allowing spatial filtering of the waves received may also be used. Such sensors are described for example in U.S. Pat. No. 3,798,474 granted to the applicant.

In some applications where similar intervention assemblies are arranged in various locations along one or several wells for a certain intervention type, central processor 25 may connect a unit 22 specialized in the application and command, through sequential addressings, the successive connection of all the intervention assemblies, so as to record simultaneously the responses thereof. Such a lay-out is useful for example in active or passive monitoring applications where several arrays of acoustic or seismic receivers are available. These receiver arrays may be installed in a fixed position in a single well at several distinct depths. They may also be installed in a fixed position in several distinct wells, with at least one array of receivers in each of the wells. The surface station is connected to the receiver arrays of each well through a cable and can control, by addressing, acquisition of the signals received by all the receivers of all the arrays and centralization of the signals in coded digitized form, as well as the recording thereof by a recording device.

An embodiment of the system in accordance with the invention has been described, in which the central station controls, by addressing and sending of specific orders, allocation of conductors L3 to the intervention assemblies, and the intervention assemblies, with these conductor at their disposal, can master the transfer of data towards the central station. However, without departing from the scope of the invention, the monitoring modules MV defined above may be replaced by monitoring modules suited to certain specific applications.

According to a first particular embodiment, the monitoring modules used are capable, at the end of a predetermined allocation time, of forming the address of another monitoring module connected on the same cable. With such a wiring mode for the monitoring modules, automatic successive connection of several intervention assemblies on a cable is obtained without the intervention of specific orders from the surface, with the possibility of a continuous relooping of the addressing cycles. The surface station may, in such a configuration, comprise only means for the power supply of the monitoring modules and the data recording means that are transmitted to the station by the intervention assemblies that are cyclically connected.

According to another particular embodiment, it is possible to set intervention assemblies whose monitoring module is adapted to react to at least two different addresses. One is a specific address which designates the module only. Another one at least designates several different intervention assemblies likely to react at the same time to a common order addressed thereto., Such an operating mode is suited for example for different intervention assemblies that may collect data of the same nature, such as seismic data acquisition assemblies for example. One possible application is the simultaneous addressing of several acquisition assemblies MT installed in a fixed position and provided with memories.

At the same time, central station 4 may send them an order of acquisition of the signals received and of storage in the local memory. The order is decoded by decoding means 6 and transmitted to the corresponding assemblies MT. At the end of the acquisition process, the central stat ion may trigger, by specific addressings, the successive connection of each of the user assemblies that have stored data on the transmission conductors (L3) and the transfer of these data in the surface recording device.

A connection mode of switches 9 has been described in connection with FIGS. 2, 6, 9, 12 for example, which has the effect of allocating line L3 to only one user module at a time. However, without departing from the scope of the invention, switches 9 may be connected differently so as to allow for example line L3 to be allocated to more than only one user module at a time, for certain specific applications.

Without departing from the scope of the invention, the system in accordance with the invention may be used for seismic prospecting by utilizing the vibrations produced at the well bottom by a drill bit or a seismic source fastened to a drill string close to a bit.

More generally, the improved system in accordance with the invention may be used for links between a central station and any permanent active or passive monitoring installation, whatever it may be.

We claim:

1. A system for monitoring of an underground deposit by an intervention device disposed at a fixed position in at least one well passing through said deposit, said intervention device including:
   at least one intervention assembly provided with a set function;
   at least one cable for linking a surface installation to each intervention assembly; and
   each intervention assembly having a user module, a monitoring module permanently connected to said at least one cable and provided with a decoder for decoding address signals, and a switch controlled by said decoder for intermittently electrically connecting said at least one cable to each user module addressed by the address signal to at least one of electrical power and bidirectionally transmitted signals during a time interval that the user module is connected to said at least one cable by said switch.

2. A system according to claim 1 wherein:
   said at least one cable is provided with at least one first line for connection of said monitoring module in each intervention assembly to the surface assembly and at least one second line for transmission of at least control and data signals between the surface assembly and the user module of each intervention assembly when connected by said switch and;
   said surface assembly including at least an electric supply module for electrical feeding of the monitoring module of each intervention assembly.

3. A system according to claim 1 wherein:
   said at least one cable is provided with at least one first line for connection of said monitoring module in each intervention assembly to the surface assembly and at least one second optical line for connection of the user module of each intervention assembly with the surface assembly; said switch including an optical coupler cooperating with said optical line and said monitoring module for bidirectional intermittent transmissions on said optical line; and said surface assembly including at least an electrical feeding module for feeding of the monitoring module of each intervention assembly.

4. A system according to claim 1 wherein the surface assembly comprises:
a control processor, a connector for applying electrical current to the at least one cable, a connector for coupling address signals to each monitoring module and at least one unit for controlling communication between said control processor and each addressed user module.

5. A system according to claim 1 wherein the user module of at least one intervention assembly comprises:
a receiver and a data acquisition and transmission unit.

6. A system according to claim 5 wherein said acquisition and transmission unit comprises:
a clock for generating a local clock signal for use in digitization of data produced by an associated receiver and transmission thereof to said surface assembly; and
said surface assembly includes a unit comprising a synchronizer to restore a clock signal having a phase timed with said local clock signal.

7. A system according to claim 5 comprising:
a plurality of receivers and said data acquisition and transmission unit includes a multiplexor connected to said plurality of receivers.

8. A system according to claim 7 wherein:
said plurality of receivers are sensors for measuring condition parameters.

9. A system according to claim 1 wherein the user module of at least one intervention assembly comprises:
at least one receiver for measuring a condition parameter and delivering in response a proportionate current, said at least one receiver being connected by said at least one cable through said switch.

10. A system according to claim 9 comprising:
a plurality of receivers in said at least one intervention unit and the user module in said at least one intervention unit including a selector controlled by an associated electronic monitoring module for selectively connecting said plurality of receivers to said at least one cable through said switch.

11. A system according to claim 1 wherein the user module of at least one intervention assembly comprises:
at least one receiver to measure a physical parameter and delivering in response a voltage; and
an adaptation and transmission unit comprising a voltage-controlled oscillator having an output connected selectively to at least one signal transmission channel by said switch.

12. A system according to claims 1 wherein at least one user module comprises:
an electromagnetic transducer for converting electrical energy into mechanical energy;
said transducer is connected to said at least one cable and;
said surface assembly includes a unit for delivering electrical energy.

13. A system according to claim 6 comprising:
at least one seismic source; and wherein;
at least one intervention assembly includes an array of seismic sensors connected with said acquisition and transmission unit;
said unit of said surface assembly communicates with said acquisition and transmission unit for determining the frequency of the clock signal emitted by said clock; and
said processor includes a trigger for triggering said at least one seismic source and a unit for associating with data received from the acquisition and transmission unit a signal indicative of a time of triggering of said at least one seismic source.

14. A system according to claim 1 comprising:
at least one array of receivers in boxes with each receiver being associated with electrical conductors for connection to an electronic module and hydraulic lines arranged between said boxes and an associated electronic module with electrical conductors associated with the array of receivers passing through said hydraulic lines.

15. A system according to claim 1 wherein:
at least one intervention assembly is arranged outside a casing of at least one well.

16. A system according to claim 1 comprising:
at least one intervention assembly provided with one of acoustic and seismic wave sensors with said intervention assembly being positioned outside a casing in at least one well.

17. A system according to claim 1 wherein:
at least one intervention assembly is arranged outside tubing set in at least one well.

18. A system according to claim 1 comprising:
at least one intervention assembly provided with one of acoustic and seismic wave sensors with said intervention assembly being positioned outside a casing in at least one well.

19. A system according to claim 1 wherein:
at least one of said sensors is a continuous hydrophone with a length sufficient for performing spatial filtering of received waves received.

20. A system according to claim 19 comprising:
at least one first array of one of seismic and acoustic receivers associated with a first acquisition and transmission unit;
at least one second array associated with a second acquisition and transmission unit for measuring received energy; and
a surface assembly comprising a processor, at least two units communicating respectively with said acquisition and transmission units, and interface circuits for communication between said at least two specialized units and said processor.

21. A system according to claim 4 wherein said surface assembly comprises:
means for sequential addressing a plurality of intervention assemblies installed in a fixed position in at least one well.

22. A system according to claim 4 wherein each intervention assembly comprises:
a decoder provided with means for forming at the end of the intervention assembly connection orders to be addressed to the decoder of another intervention assembly.

23. A system according to claim 1 wherein said monitoring modules of a plurality of intervention assemblies comprise:
an address and order decoder provided with a first specific address and with a second address common to all said plurality of intervention assemblies.

24. A system according to claim 23 wherein said plurality of intervention assemblies comprise:
acquisition and transmission units provided with a memory for storing data measured by receivers.

25. A system according to claim 1 wherein each cable comprises:
a first line for transmission of address and control signals to each monitoring module, a second line for supplying electrical power to said monitoring modules and a third line for the selective connection of each user module with said surface assembly.

26. A system according to claim 1 wherein each cable comprises:
a first line for transmission of address and control signals and electrical energy to each monitoring module and another line for the selective connection of a plurality of user modules.

27. A system according to claim 1 wherein the connector comprises:
elements for emitting and receiving signals at different frequencies.

28. A system according to claim 1 wherein the connector comprises:
elements for allocating different emission time intervals for the transmission of signals according to a direction of propagation thereof on the at least one cable.

29. A method for monitoring of an underground deposit by a system including a surface assembly, at least one intervention assembly provided with a set function disposed in a fixed position in at least one well passing through said deposit, and at least one cable for linking the surface assembly to each intervention assembly which each intervention assembly including a user module, a monitoring module permanently connected to said at least one cable and provided with a decoder for decoding address signals and a switch, said method comprising:
connecting said at least one cable to said at least one intervention assembly by applying, on said at least one cable control signals addressed to an associated electronic monitoring module, decoding control signals with the decoder in said monitoring module controlling with said monitoring module the switch to cause the user module to be connected to the at least one cable through the switch, and transferring signals from said user module according to determined modes of transfer, to a particular unit of the surface assembly for receiving said signals from said user module.

30. A method as claimed in claim 25 further comprising:
triggering a seismic source and allocating to an acquisition and transmission unit of the user module a transmission time interval for transferring all seismic signals subsequently sensed by a set of sensors included in at least one intervention assembly to a unit of the surface assembly.

31. A method according to claim 30 comprising:
achieving seismic emission-reception cycles with said seismic source being associated with a drill bit in a well.

32. A method according to claim 30 comprising:
sequentially addressing a plurality of monitoring modules in a plurality of intervention assemblies arranged in at least one well so as to perform sequential signal transfers between the intervention assemblies and the surface assembly.

33. A method according to claim 30 comprising:
simultaneously transmitting to a plurality of intervention assemblies control signals for recording the data received from a single time interval.

34. A system according to claim 1 wherein:
said at least one cable comprises a single line;
the surface assembly comprises means for applying direct current to said line and means for applying to said single line coded signals for the transmission of signals according to the direction of transmission thereof on the line.

* * * * *